July 1, 1930. O. J. GROEHN ET AL 1,769,571
WORKHOLDER
Original Filed Dec. 28, 1927
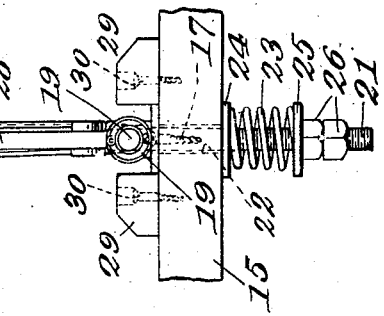
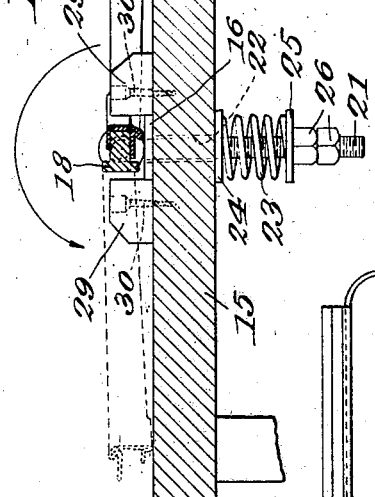
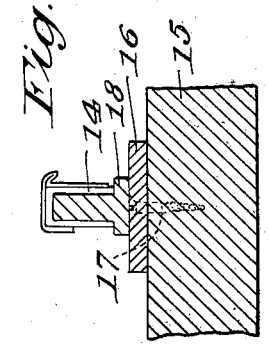
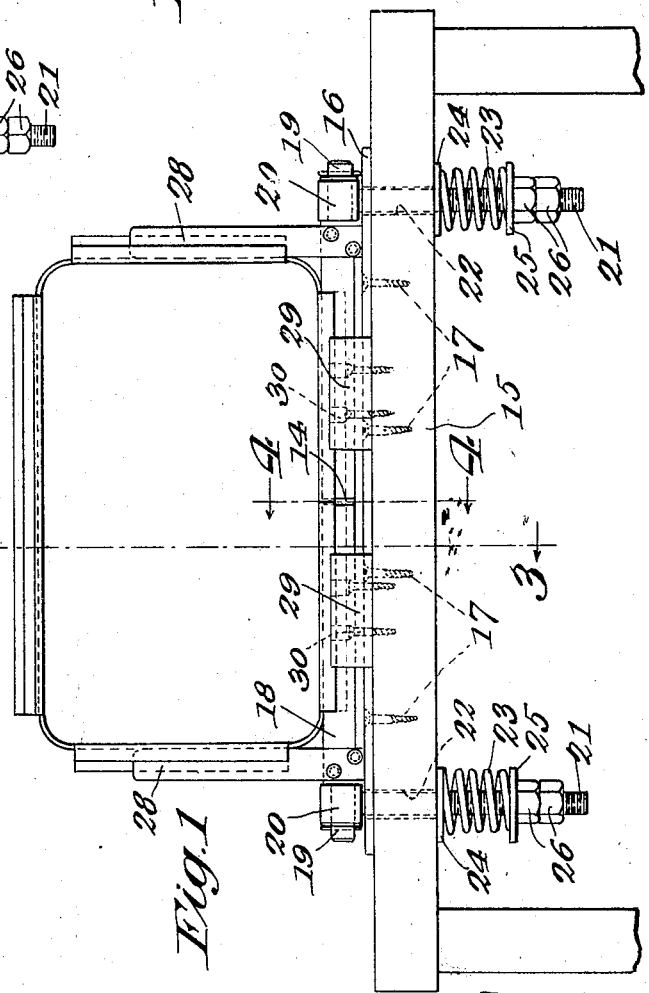
Inventors:
Otto J. Groehn
Lawrence E. Lamb
By Meadow, Calver, Copeland, Dike,
Attorneys.

Patented July 1, 1930

1,769,571

UNITED STATES PATENT OFFICE

OTTO J. GROEHN, OF GROSSE POINTE PARK, AND LAWRENCE S. LAMB, OF GROSSE POINTE, MICHIGAN, ASSIGNORS TO HUDSON MOTOR CAR COMPANY, OF DETROIT, MICHIGAN, A CORPORATION OF MICHIGAN

WORK HOLDER

Original application filed December 28, 1927, Serial No. 243,030. Patent No. 1,708,615, dated April 9, 1929. Divided and this application filed February 8, 1929. Serial No. 338,469.

This invention relates to a device for holding strip sheet metal, as for example, when joining together the free ends of the strip as by welding.

This application is a division of our co-pending application Serial No. 243,030, filed December 28, 1927, Patent No. 1,708,615, dated April 9, 1929, which discloses a method of shaping sheet metal to produce a quarter window finish molding for an automobile body.

It is the object of the invention to provide a device for holding strip sheet metal in various desired positions when performing a mechanical operation thereon such as welding the free ends of a strip of sheet metal previously flanged and shaped to polygonal form with the free ends together as described in our above mentioned co-pending application.

The invention will be more clearly understood from the following description taken in conjunction with the accompanying drawing; in which, Fig. 1 is a front elevational view of a device embodying the invention;

Fig. 2 is an end elevational view of the same;

Fig. 3 is a sectional view taken upon line 3—3 of Fig. 1, showing the frame in a horizontal position.

Fig. 4 is a sectional view taken upon the line 4—4 of Fig. 1, showing the frame in vertical position.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology of terminology employed herein is for the purpose of description and not of limitation, and it is not intended to limit the invention beyond the terms of the several claims hereto appended as considered in view of the prior art and the requirements thereof.

One embodiment of the invention is illustrated by the device shown in the drawing which comprises a table 15 (Figs. 1 to 4) having a plate 16 secured to the top surface thereof in any suitable manner as by screws 17. A frame comprising a T-shaped base 18 having a slot 14 is provided with cylindrical projections 19 mounted in bearings 20. The bearings 20 are secured to the table 15 by bolts 21 passing freely through openings 22 in the table and extending beyond the lower surface of the table. The extension of each of the bolts 21 is surrounded by a spring 23 extending between a washer 24 abutting the bottom surface of the table and a washer 25 held and secured near the outer ends of the bolts, by nuts 26. The T-shaped frame is provided with upright members 28 secured to the frame adjacent the projections 19. Blocks 29 are secured to the table, as by screws 30.

The strip of sheet metal folded to the shape of a polygon with the free ends together is placed in the frame with opposite sides engaging the upright members 28 and with the portions adjacent the free ends of the strip of sheet metal engaging the T-shaped frame member 18 directly above the slot 14. With the frame in a vertical position the free ends of the body of the strip of sheet metal are welded together and the frame is turned to bring the frame members 28 to a horizontal position. The free ends of one set of flanges are then welded together and the frame turned to bring the members 28 in a horizontal position on the opposite side of the original vertical position and the free ends of the other set of flanges are welded together. The springs 23 permit yield of the bearings 20 to provide clearance for the bottom of the T-shaped frame 18 when being turned and yet hold the frame rigidly in the position to which it has been turned.

What we claim is:

In an apparatus for forming a flanged strip of sheet metal to polygonal shape, the combination of a support, a frame adapted to engage the sides of the polygon to hold the free ends of the strip of metal together while being welded, said frame comprising a main body adapted to engage one side of the polygon and having spaced arms integral therewith for engagement with the sides of the polygon adjacent thereto, and yieldable bearings on the support for pivotally mounting the frame to hold the same firmly in vertical and horizontal positions.

In testimony whereof we affix our signatures.

OTTO J. GROEHN.
LAWRENCE S. LAMB.